(12) United States Patent
Berndt

(10) Patent No.: US 6,344,610 B1
(45) Date of Patent: Feb. 5, 2002

(54) RIGID ELECTRICAL CONDUCT WITH PASS-THROUGH CUT-OUT FOR USE IN A MODULAR WALL PANEL

(75) Inventor: Curtis G. Berndt, Fremont, IN (US)

(73) Assignee: Pent Products, Inc., Kendallville, IN (US)

( * ) Notice: Subject to any disclaimer, the term of this patent is extended or adjusted under 35 U.S.C. 154(b) by 0 days.

(21) Appl. No.: 09/534,110

(22) Filed: Mar. 23, 2000

(51) Int. Cl.$^7$ ................................................. H02G 3/04
(52) U.S. Cl. ........................... 174/48; 174/50; 52/220.7; 52/239
(58) Field of Search ................... 174/48, 64, 65 R, 174/21 R, 59, 50; 52/220.7, 239, 220.3

(56) References Cited

U.S. PATENT DOCUMENTS

| | | | |
|---|---|---|---|
| 4,156,795 A | 5/1979 | Lacan ........................... 174/97 |
| 4,308,418 A * | 12/1981 | Van Kuik et al. ............. 174/48 |
| 4,323,949 A | 4/1982 | Guritz et al. ................ 361/428 |
| 4,593,507 A | 6/1986 | Hartman ....................... 52/221 |
| 4,661,652 A | 4/1987 | Benscoter ..................... 174/48 |
| 4,808,768 A | 2/1989 | Sireci ............................ 174/48 |
| 4,952,163 A | 8/1990 | Dola et al. .................. 439/211 |
| 5,039,827 A | 8/1991 | Harmon ........................ 174/48 |
| 5,041,002 A * | 8/1991 | Byrne .......................... 439/215 |
| 5,178,555 A * | 1/1993 | Kilpatrick et al. ........... 439/215 |
| 5,202,537 A | 4/1993 | Nusbaum ...................... 174/48 |
| 5,726,387 A | 3/1998 | Teinturier et al. ........... 174/68.3 |

* cited by examiner

Primary Examiner—Dean A. Reichard
Assistant Examiner—Hung T. Nguyen
(74) Attorney, Agent, or Firm—Taylor & Aust, P.C.

(57) ABSTRACT

An electrical distribution system includes a structural member having an electrical distribution chamber therein. A rigid conduit is positioned within the electrical distribution chamber, and includes two longitudinally opposite ends, at least one side wall extending between the ends, and a keyed electrical connector at each end. At least one side wall has an indentation therein. An electrical transmission element which is separate from the rigid conduit passes through the indentation.

12 Claims, 3 Drawing Sheets

RIGID ELECTRICAL CONDUCT WITH PASS-THROUGH CUT-OUT FOR USE IN A MODULAR WALL PANEL

BACKGROUND OF THE INVENTION

1. Field of the Invention.

The present invention relates to electrical distribution systems within a modular wall panel assembly, and, more particularly, to electrical conduits within a wall panel assembly.

2. Description of the Related Art.

In an office environment, more and more electrical equipment such as computer equipment and communications equipment is utilized. It is thus common to provide electrical distribution systems within the structural members which separate and define the work stations within the office environment. The electrical distribution systems may be utilized to transmit power and/or data to the various work stations. The electrical distribution systems may be positioned within modular wall panel assemblies, stationary walls and/or under the floor. A problem associated with the use of electrical distribution systems within structural members in an office environment is that the space within the structural members which is provided for running the electrical distribution systems is often constrained. For example, modular wall panels are commonly reconfigured to change the work station layout within the office environment. Accordingly, the wall panels are typically made light weight and have relatively small chambers therein in which the electrical distribution system is positioned. It is sometimes necessary or desirable to run the electrical distribution system in multiple directions to provide power and/or data at selected outlet locations. Because of the tight geometric constraints within the chambers in the modular wall panels, the different conduits forming part of the electrical distribution system cannot run past each other in a side by side manner within the wall panel. These same problems can occur within floor and stationary wall applications.

What is needed in the art is an electrical distribution system for use within confined chambers in a structural member of an office environment such as a modular wall panel, which allows power and/or data to be distributed in multiple directions at any desired outlet location.

SUMMARY OF THE INVENTION

The present invention provides a rigid electrical conduit for use in a modular wall panel or the like which has a cut-out therein which allows a further electrical transmission element such as an electrical cable or second rigid electrical conduit to pass therethrough within confined spaces.

The invention comprises, in one form thereof, an electrical distribution system including a structural member having an electrical distribution chamber therein. A rigid conduit is positioned within the electrical distribution chamber, and includes two longitudinally opposite ends, at least one side wall extending between the ends, and a keyed electrical connector at each end. At least one side wall has an indentation therein. An electrical transmission element which is separate from the rigid conduit passes through the indentation.

The invention comprises, in another form thereof, a rigid electrical conduit including a pair of longitudinally opposite ends and a longitudinal extension between the ends; a keyed electrical connector at each end; and at least one side wall extending between the ends. At least one side wall has a cut-out therein, with the cut-out extending at least one-half way through the conduit in a direction transverse to the longitudinal extension.

An advantage of the present invention is that the rigid electrical conduit allows additional electrical transmission elements, such as electrical cables or further rigid conduits, to extend multiple directions and pass each other within confined areas in a structural member.

Another advantage is that the indentation may be formed with any suitable configuration, such as a rectangular cut-out, etc.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
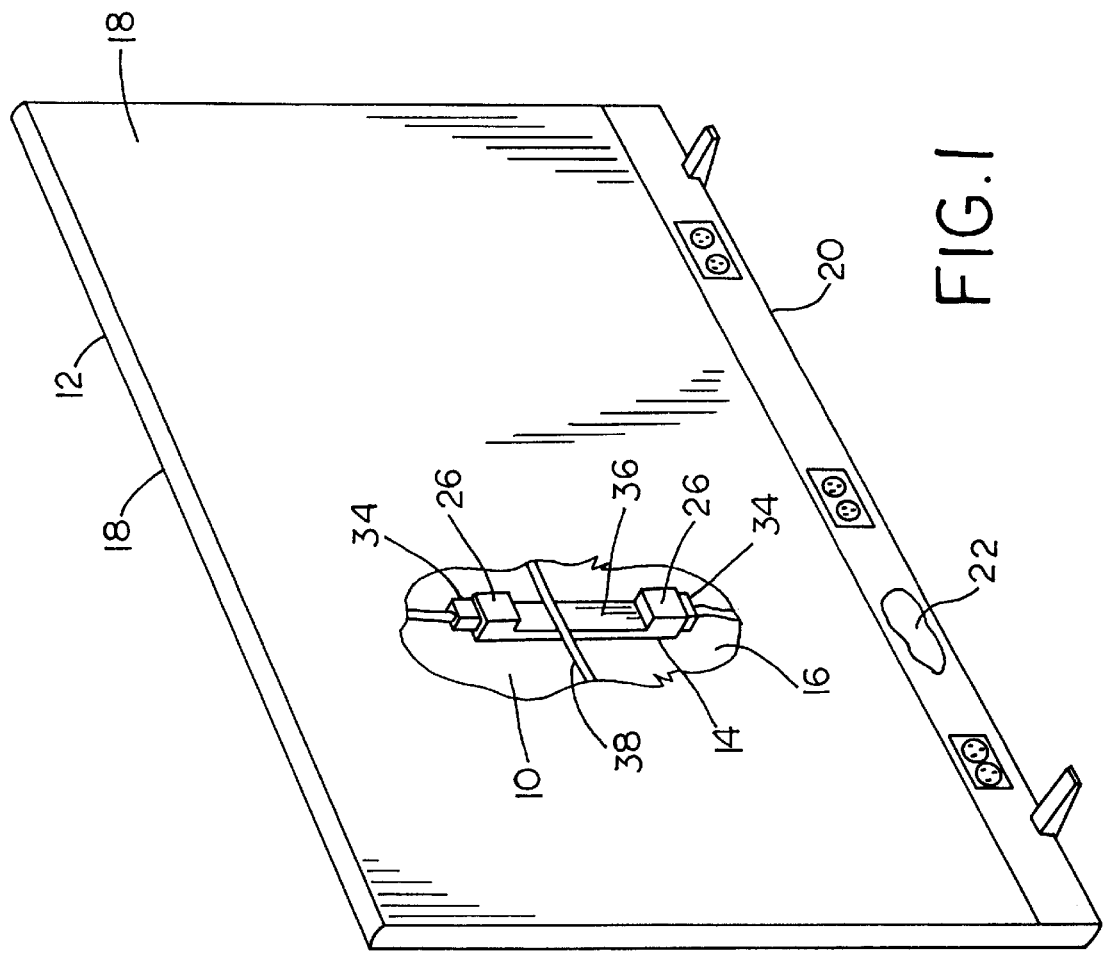
FIG. 1 is a prospective view of an embodiment of an electrical distribution system of the present invention.

Referring now to the drawings, and more particularly to FIG. 1, there is shown an embodiment of an electrical distribution system 10 of the present invention, which generally includes a structural member 12 and a rigid conduit 14 positioned therein.

Structural member 12 is used within an office environment to distribute power from one work station to another. In the embodiment shown, structural member 12 is in the form of a modular wall panel used to separate the adjacent work stations and distribute power therebetween. However, structural member 12 may form a different part of an office environment, such as a floor or stationary wall. Regardless of the specific configuration, structural member 12 has the common feature of an electrical distribution chamber 16 therein in which rigid conduit 14 is disposed. Structural member 12 overlies rigid conduit 14 in close proximity, as will be described hereinafter.

Modular wall panel 12, as shown in FIG. 1, includes two sides 18 and a bottom 20. An electrical distribution raceway 22 is positioned adjacent bottom 20, in known manner. Sides 18 define electrical distribution chambers 16 therebetween, in which rigid conduit 14 is disposed. However, depending upon the specific configuration and intended use, electrical distribution chamber 16 may be positioned between sides 18 and/or within raceway 22.

Figure 2:
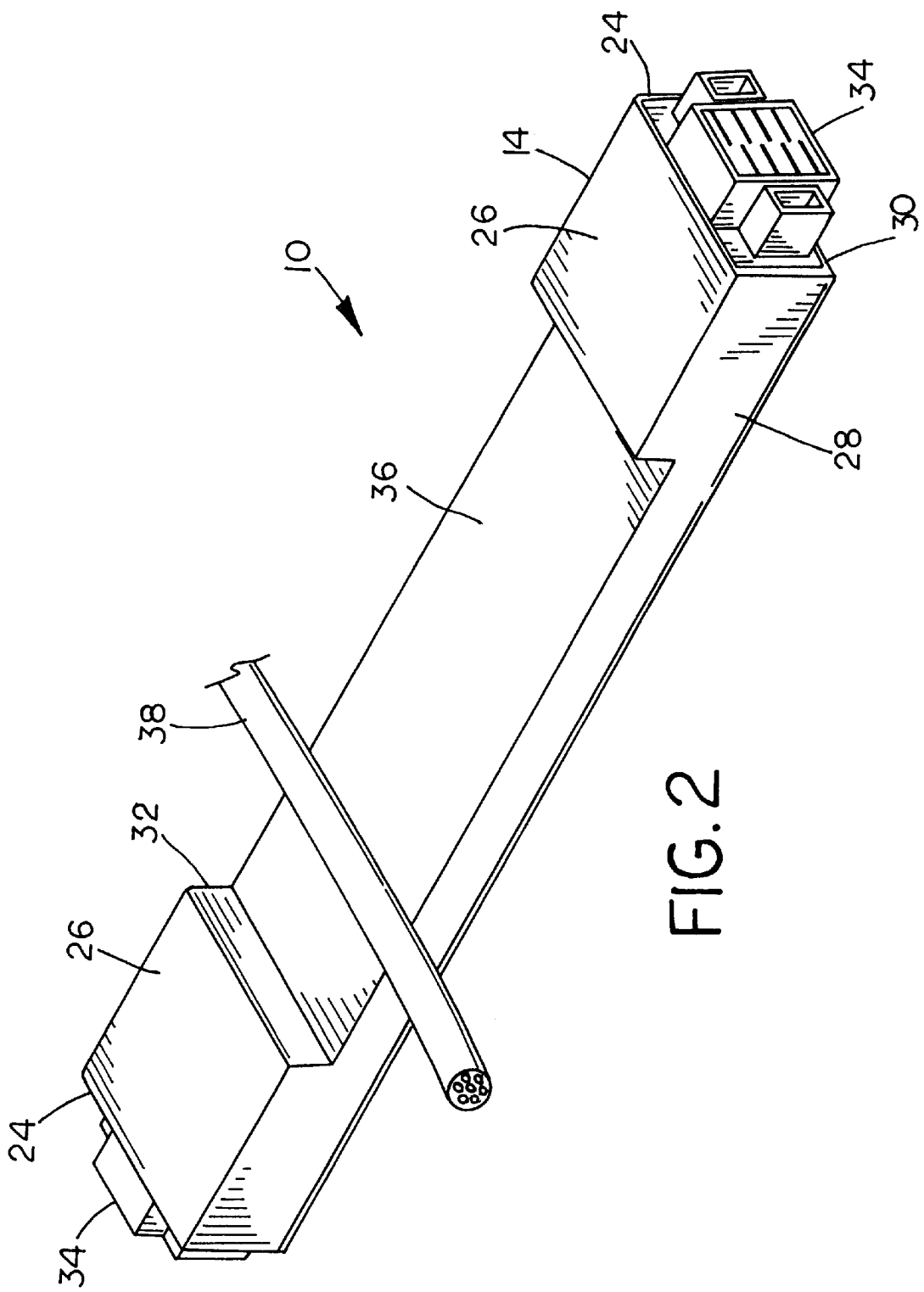
FIG. 2 is a prospective view of the rigid conduit shown in FIG. 1.

Rigid conduit 14, shown in more detail in FIG. 2, includes two longitidunally opposite ends 24, four sidewalls 26, 28, 30, 32 extending between ends 24, and a keyed electrical connector 34 at each end 24.

Electrical connectors 34 provide electrical interconnection with other electrical components such as further conduits, rigid distribution harnesses and/or flexible distribution harnesses. Connectors 34 may have any suitable keying configuration providing keyed interconnection with a selected electrical component.

According to an aspect of the present invention, conduit 14 includes an indentation 36 which is formed in sidewalls 26, 28 and 32 and extends from sidewall 26. In the embodiment shown, indentation 36 is in the form of a cut-out which extends at least one-half way through conduit 14 in a direction transverse to a longitudinal extension extending between ends 24. Cut-out 36 is sized and configured to allow an electrical transmission element 38 to pass therethrough, given the tight geometric constraints within electrical distribution chamber 16. In the embodiment shown, electrical transmission element 38 is in the form of a multi-conductor cable which passes through modular wall panel 12 or is connected with one or more electrical component(s) within modular wall panel 12. Since sides 18 lay closely adjacent to rigid conduit 14, cut-out 36 allows cable 38 to pass through rigid conduit 14, without the necessity to re-route cable 38 to other areas within wall panel 12 to bypass rigid conduit 14.

Figure 3:
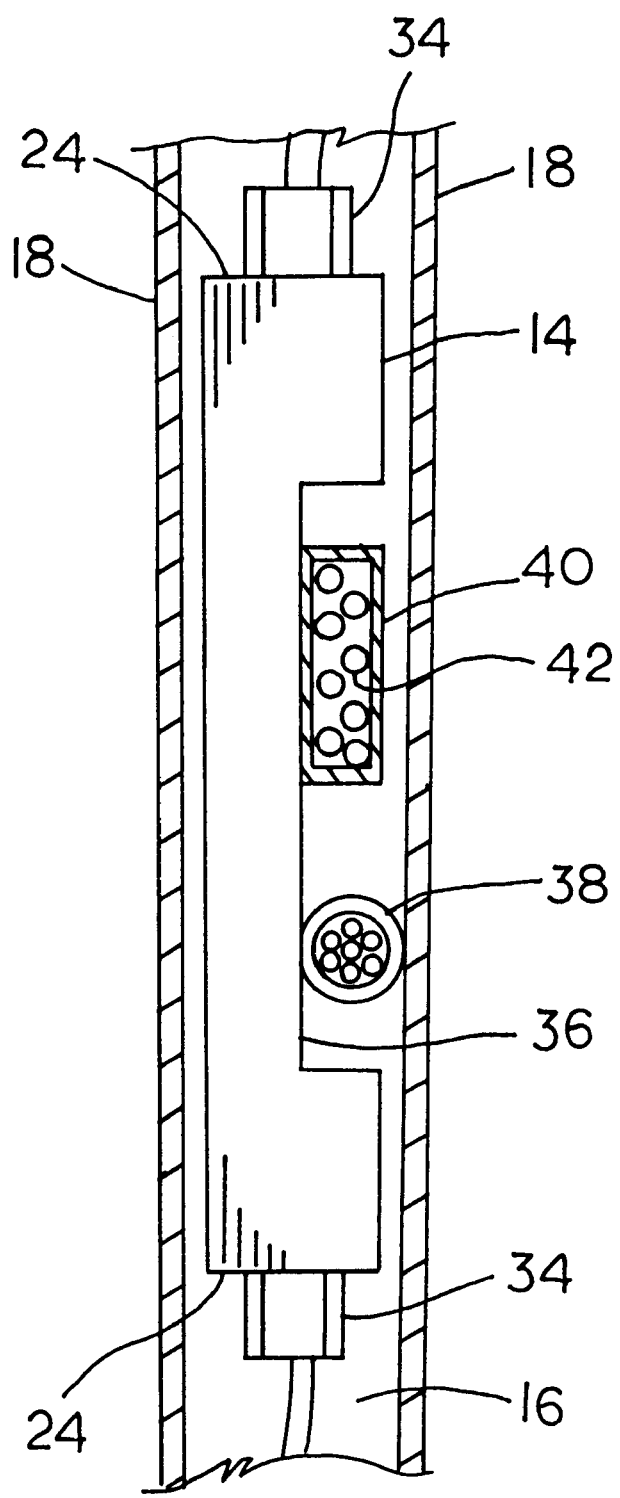
FIG. 3 is a side, sectional view of the rigid conduit shown in FIG. 1.

By providing rigid conduit with a cut-out 36 which extends approximately one-half the depth thereof, a second rigid conduit 40 (FIG. 3) which is configured the same as rigid conduit 14 may pass through rigid conduit 14. At the pass through location between rigid conduit 14 and second rigid conduit 40, the combined thickness adjacent the cut-outs is approximately equal to the thickness of either rigid conduit 14 or second rigid conduit 40 adjacent ends 24, thereby not increasing the overall effective thickness at the pass through location.

Rigid conduit 14 provides proper electrical interconnection with other electrical components while at the same time providing a pass through function within the tight geometric constraints of electrical distribution chamber 16 within modular wall panel 12. Connectors 34 cannot be simply reduced in size because of manufacturing, electrical arcing, and other considerations. However, the insulated electrical conductors 42 within rigid conduit 14 which electrically interconnect connectors 34 do not utilize all of the space within rigid conduit 14 adjacent sidewall 26 at longitudinally opposite ends of cut-out 36. Thus, rigid conduit 14 may be reduced in cross section by forming cut-out 36 therein without affecting the electrical functionality thereof.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical distribution system, comprising:

a structural member having an electrical distribution chamber therein;

a rigid conduit positioned within said electrical distribution chamber, said conduit having two longitudinally opposite ends, at least one side wall extending between said ends, and a keyed electrical connector at each said end, at least one said side wall having an indentation therein; and an electrical transmission element separate from said conduit, said electrical transmission element passing through said indentation.

2. The electrical distribution system of claim 1, wherein said indentation comprises a cut-out.

3. The electrical distribution system of claim 2, wherein said at least one side wall comprises four side walls, said cut-out formed in three of said side walls.

4. The electrical distribution system of claim 3, wherein said cut-out extends at least one-half way through said conduit.

5. The electrical distribution system of claim 4, wherein said electrical transmission element comprises one of an electrical cable and a like-configured second rigid conduit.

6. The electrical distribution system of claim 1, wherein said conduit has a longitudinal extension and said indentation extends at least one-half way through said conduit in a direction transverse to said longitudinal extension.

7. The electrical distribution system of claim 6, wherein said electrical transmission element comprises one of an electrical cable and a like-configured second rigid conduit.

8. The electrical distribution system of claim 1, wherein said structural member comprises one of a modular wall panel and a floor.

9. The electrical distribution system of claim 8, wherein said structural member comprises a modular wall panel having two sides and a bottom, and wherein said electrical distribution chamber comprises one of a raceway along said bottom, and a chamber between said sides.

10. Electrical distribution system of claim 9, wherein said rigid conduit is positioned between said two sides.

11. A rigid electrical conduit, comprising:

a pair of longitudinally opposite ends and a longitudinal extension between said ends;

a keyed electrical connector at each said end; and at least one side wall extending between said ends, at least one said side wall having a cut-out therein, said cut-out extending at least one-half way through said conduit.

12. The rigid electrical conduit of claim 11, wherein said at least one side wall comprises four side walls, said cut-out formed in three of said side walls.

* * * * *

UNITED STATES PATENT AND TRADEMARK OFFICE
CERTIFICATE OF CORRECTION

PATENT NO. : 6,344,610 B1
DATED : February 5, 2002
INVENTOR(S) : Curtis G. Berndt It is certified that error appears in the above-identified patent and that said Letters Patent is hereby corrected as shown below:

<u>Title page, Item [54] and Column 1, line 1,</u>
In the title, delete "CONDUCT" and substitute -- CONDUIT-- therefor.

Signed and Sealed this

Eleventh Day of March, 2003

JAMES E. ROGAN
*Director of the United States Patent and Trademark Office*